(12) United States Patent
Choi

(10) Patent No.: US 10,542,579 B2
(45) Date of Patent: Jan. 21, 2020

(54) BASE STATION AND OPERATION METHOD THEREOF

(71) Applicant: Electronics and Telecommunications Research Institute, Daejeon (KR)

(72) Inventor: Min Suk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 41 days.

(21) Appl. No.: 15/921,784

(22) Filed: Mar. 15, 2018

(65) Prior Publication Data

US 2018/0270892 A1    Sep. 20, 2018

(30) Foreign Application Priority Data

Mar. 17, 2017   (KR) .................. 10-2017-0033801

(51) Int. Cl.
  *H04W 76/27*  (2018.01)
  *H04W 76/38*  (2018.01)
  *H04W 36/34*  (2009.01)
  *H04W 76/32*  (2018.01)
  *H04W 74/08*  (2009.01)

(52) U.S. Cl.
  CPC .......... *H04W 76/27* (2018.02); *H04W 36/34* (2013.01); *H04W 76/38* (2018.02); *H04W 74/0833* (2013.01); *H04W 76/32* (2018.02)

(58) Field of Classification Search
  None
  See application file for complete search history.

(56) References Cited

U.S. PATENT DOCUMENTS

| | | | |
|---|---|---|---|
| 8,554,238 | B2 | 10/2013 | Hwang et al. |
| 9,515,757 | B2 | 12/2016 | Koc et al. |
| 2009/0213800 | A1 | 8/2009 | Lee et al. |
| 2013/0260811 | A1* | 10/2013 | Rayavarapu .......... H04W 76/19 |
| | | | 455/509 |
| 2014/0148226 | A1* | 5/2014 | Kim .................. H04W 52/0251 |
| | | | 455/566 |
| 2014/0192798 | A1* | 7/2014 | Yang ................. H04W 56/0045 |
| | | | 370/350 |
| 2014/0307659 | A1 | 10/2014 | Kweon et al. |
| 2015/0223284 | A1 | 8/2015 | Jain et al. |
| 2016/0057795 | A1 | 2/2016 | Kim et al. |
| 2016/0119762 | A1 | 4/2016 | Zhu et al. |
| 2016/0360450 | A1* | 12/2016 | Yang ..................... H04W 76/34 |
| 2017/0367044 | A1* | 12/2017 | Fujishiro ................ H04W 4/14 |
| 2019/0124714 | A1* | 4/2019 | Wang ................... H04W 76/27 |

* cited by examiner

*Primary Examiner* — Christine T Duong
(74) *Attorney, Agent, or Firm* — Rabin & Berdo, P.C.

(57) ABSTRACT

An operation method of a base station in a mobile communication network may comprise determining to disconnect a radio resource control (RRC) connection; transmitting a RRC connection release message to a terminal; releasing the RRC connection with the terminal while maintaining an S1-U bearer set up between the base station and a serving gateway (S-GW); and releasing the S1-U bearer after maintaining the S1-U bearer for a first time.

9 Claims, 7 Drawing Sheets

BASE STATION AND OPERATION METHOD THEREOF

CROSS-REFERENCE TO RELATED APPLICATIONS

This application claims priority to Korean Patent Application No. 10-2017-0033801 filed on Mar. 17, 2017 in the Korean Intellectual Property Office (KIPO), the entire contents of which are hereby incorporated by reference.

BACKGROUND

1. Technical Field

The present disclosure relates to a base station and an operation method of the base station, and more specifically, to a base station and an operation method of the base station, which can simplify a procedure related to state transition of a terminal.

2. Related Art

The communication system may include a core network (e.g., a mobility management entity (MME), a serving gateway (S-GW), a packet data network (PDW) gateway (P-GW), and the like), a base station (e.g., a macro base station, a small base station, a relay, and the like), a terminal, and the like. Communications between the base station and the terminal may be performed using various radio access technologies (RATs) (e.g., 4G communication technologies, 5G communication technologies, wireless local area network (WLAN) technologies, wireless personal area network (WPAN) technologies, and the like).

In long term evolution (LTE) cellular systems set forth in the LTE specifications, a mobile terminal may connect to a base station (evolved node B (eNodeB or simply eNB)). The base station may provide the terminal with connectivity to other network entities of the LTE system that connect to an external network such as the Internet. Providing such the network connectivity involves setting up bidirectional data paths, called bearers, between the different network entities of the LTE system. For efficiency, the bearers are set up when the terminal transitions from an idle state to a connected state, and are released when the terminal transitions from the connected state to the idle state.

As the number of data transmissions increases, the number of state transitions of the terminal also increases. Accordingly, the signaling overhead may be caused by repeatedly setting up and releasing the bearers for each state transition of the terminal.

SUMMARY

Accordingly, embodiments of the present disclosure provide an operation method of a base station and an operation method of a terminal for simplifying a procedure related to state transition of the terminal.

In order to achieve the objective of the present disclosure, an operation method of a base station in a mobile communication network may comprise determining to disconnect a radio resource control (RRC) connection; transmitting a RRC connection release message to a terminal; releasing the RRC connection with the terminal while maintaining an S1-U bearer set up between the base station and a serving gateway (S-GW); and releasing the S1-U bearer after maintaining the S1-U bearer for a first time.

When an RRC connection resume request message is received from the terminal before a time of maintaining the S1-U bearer after releasing the RRC connection exceeds the first time, the S1-U bearer may be maintained and the RRC connection may be resumed.

The operation method may further comprise maintaining the RRC connection for a second time before releasing the RRC connection after transmitting the RRC connection release message.

When an RRC connection resume request message is received from the terminal before a time of maintaining the RRC connection after transmitting the RRC connection release message exceeds the second time, the RRC connection may not be released.

The RRC connection release message may include information on the second time.

The operation method may further comprise transmitting a user equipment (UE) context release request message to a mobility management entity (MME).

The RRC connection release message may include information on a timing advance (TA) of the terminal.

When an RRC connection resume request message is received without receiving a random access channel from the terminal after transmitting the RRC connection release message, information on a new TA may not be transmitted, and the RRC connection may be resumed.

In order to achieve the objective of the present disclosure, an operation method of a terminal may comprise receiving a radio resource control (RRC) connection release message from a base station; maintaining a RRC connection between the terminal and the base station for a predetermined time after receiving the RRC connection release message; and releasing the RRC connection after a lapse of the predetermined time.

The RRC connection release message may include information on a timing advance (TA) of the terminal.

The operation method may further comprise verifying a validity of the TA received as included in the RRC connection release message; and when the TA is valid, transmitting an RRC connection resume request message by using the TA.

The validity of the TA may be verified based on a traveled distance of the terminal.

In order to achieve the objective of the present disclosure, a base station in a mobile communication network may comprise a processor and a memory storing at least one instruction executed by the processor. Here, the at least one instruction may be configured to determine to disconnect a radio resource control (RRC) connection; transmit a RRC connection release message to a terminal; release the RRC connection with the terminal while maintaining an S1-U bearer set up between the base station and a serving gateway (S-GW); and release the S1-U bearer after maintaining the S1-U bearer for a first time.

When an RRC connection resume request message is received from the terminal before a time of maintaining the S1-U bearer after releasing the RRC connection exceeds the first time, the at least one instruction may be further configured to maintain the S1-U bearer, and resume the RRC connection.

The at least one instruction may be further configured to maintain the RRC connection for a second time before releasing the RRC connection after transmitting the RRC connection release message.

When an RRC connection resume request message is received from the terminal before a time of maintaining the RRC connection after transmitting the RRC connection release message exceeds the second time, the at least one instruction may be further configured not to release the RRC connection.

The RRC connection release message may include information on the second time.

The at least one instruction may be further configured to transmit a user equipment (UE) context release request message to a mobility management entity (MME).

The RRC connection release message may include information on a timing advance (TA) of the terminal.

When an RRC connection resume request message is received without receiving a random access channel from the terminal after transmitting the RRC connection release message, information on a new TA may not be transmitted, and the RRC connection may be resumed.

Using the embodiments according to the present disclosure, the base station maintains the S1-U bearer for the first time when the state of the terminal transitions to the inactive state, thereby simplifying the procedure required for the terminal to transition back to the active state. Also, by maintaining the RRC connection between the terminal and the base station for the second time, the procedure required for the terminal to transition back to the active state can be simplified. Then, by including the timing advance in the RRC connection release message and verifying the validity of the timing advance before the terminal transmits the RRC connection resume request message, the base station can simplify the procedure required for the terminal to transition back to the active state.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
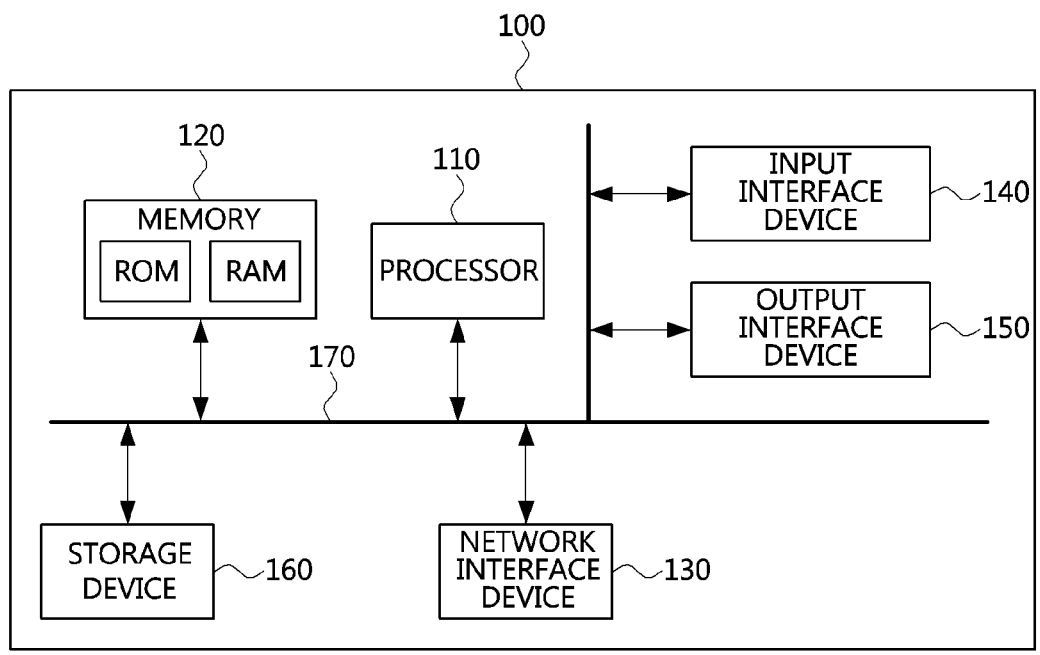
FIG. 1 is a block diagram illustrating a first embodiment of a communication node in a communication network, which performs an operation method according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the entire specification, a network may include, for example, a wireless Internet such as wireless fidelity (WiFi), a portable Internet such as a wireless broadband Internet (WiBro) or a world interoperability for microwave access (WiMax), a 2G mobile communication network such as a global system for mobile communication (GSM) or a code division multiple access (CDMA), a 3G mobile communication network such as a wideband code division multiple access (WCDMA) or a CDMA2000, a 3.5G mobile communication network such as a high speed downlink packet access (HSDPA) or a high speed uplink packet access (HSUPA), a 4G mobile communication network such as a long term evolution (LTE) network or an LTE-Advanced network, a 5G mobile communication network, a cloud radio access network (C-RAN), or the like.

Throughout the entire specification, a terminal may refer to as a mobile station, a mobile terminal, a subscriber station, a portable subscriber station, a user equipment, an access terminal, an end device, or the like, and may include all or part of the functions thereof.

Here, the terminal may include a sensor that is attached to a thing and may communicate with the thing. The sensor attached to the thing can be used to implement Internet of Things (IoT). The terminal may be a desktop computer, a laptop computer, a tablet PC, a wireless phone, a mobile phone, a smart phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, or the like.

Throughout the entire specification, a base station may refer to as an access point, a radio access station, a node B, an evolved node B, a base transceiver station, a mobile multi-hop relay (MMR)-BS, and may include all or part of the functions thereof.

In the entire specification, a radio resource control (RRC) connected state may mean a state in which a radio bearer between a base station and a terminal is set up. Also, an RRC idle state may mean a state in which the radio bearer between the base station and the terminal is released. Also, an evolved packet service (EPS) connection management (ECM) connected state may mean a state in which an S1-U bearer is set up between the base station and an S-GW. Also, an ECM idle state may mean a state in which the S1-U bearer between the base station and the S-GW is released.

Hereinafter, an operation method of a communication node in a communication network according to an embodiment of the present disclosure and a communication node performing the same will be described.

FIG. 1 is a block diagram illustrating a first embodiment of a communication node in a communication network, which performs an operation method according to an embodiment of the present disclosure.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170. However, each of the components included in the communication node 100 may be connected to the processor 110 via a separate interface or a separate bus rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
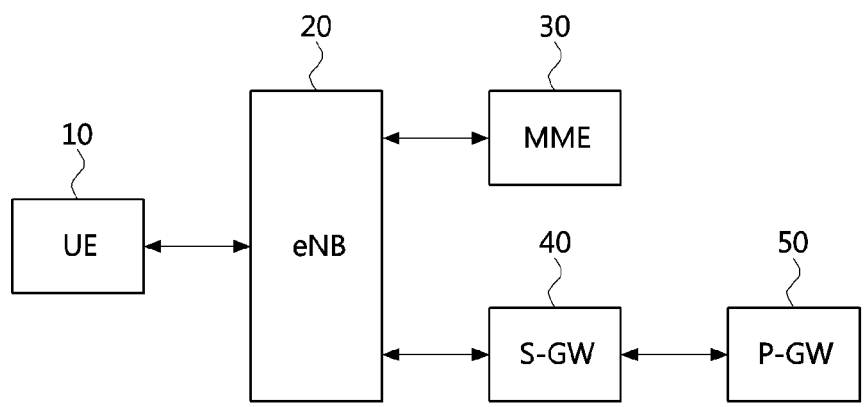
FIG. 2 is a conceptual diagram illustrating major network entities of an LTE system.

FIG. 2 is a conceptual diagram illustrating major network entities of an LTE system.

Referring to FIG. 2, a base station (also referred to as 'eNB') 20 may provide a radio interface to a terminal (also referred to as 'user equipment (UE)') 10. The radio interface between the base station 20 and the terminal 10 may be a Uu-interface. The base station 20 may provide at least one uplink channel and at least one downlink channel to the terminal 10 in the corresponding cell of the base station 20, and relay traffics between the terminal 10 and an evolved packet core (EPC). The base station 20 may control the operation of the terminal 10 by transmitting a control signal.

The EPC may include a mobility management entity (MME) 30, a serving gateway (S-GW) 40, and a packet data network (PDN) gateway (P-GW) 50.

The MME 30 may control high-level operations of the terminal 10, including management of communication sessions, security, and mobility. The terminal 10 may be allocated to one MME (e.g. the MME 30). The MME to which the terminal 10 is allocated may be changed as the terminal 10 moves.

The P-GW 50 may be a point of contact with the outside world at the EPC and may exchange data with one or more PDNs such as the Internet. The S-GW 40 may serve as a router between the base station 20 and the P-GW 50. As in the MME 30, the terminal 10 may be allocated to one S-GW (e.g., the S-GW 40). The S-GW 40 to which the terminal 10 is allocated may be changed as the terminal 10 moves.

The radio interface (e.g., Uu-interface) may provide a communication path between the terminal 10 and the base station 20. Also, network interfaces may provide communication paths between the base station 20 and the EPC and communication paths between the base station 20 and different entities of the EPC. The network interfaces may include an S1-MME interface between the base station 20 and the MME 30, an S1-U interface between the base station 20 and the S-GW 40, an X2 interface between different base stations, an S10 interface between different MMEs, and an S5/S8 interface between the S-GW 40 and the P-GW 50.

The network entities shown in FIG. 2 may communicate with other entities by packets flowing through bearers set up by specific protocols. The terminal 10 and the base station 20 may communicate with each other using radio bearers and signaling radio bearers (SRBs) through the radio interface. The base station 20 may communicate with the MME 30 using an S1-MME bearer (or S1-AP bearer) through the S1-MME interface. The base station 20 may communicate with the S-GW 40 using an S1-U bearer through the S1-U interface. The S-GW 40 may communicate with the P-GW 50 using an S5/S8 bearer through the S5/S8 interface.

The protocol for the radio interface between the terminal 10 and the base station 20 may include a radio resource control (RRC) protocol. The RRC protocol may be responsible for configuring lower layers and establishing radio bearers using RRC signaling between the base station 20 and the terminal 10. The control plane protocols that are executed between the terminal 10 and the MME 30 and are located above the RRC protocol of the terminal 10 may be referred to as non-access stratum (NAS) protocols. The NAS protocol may include an EPS mobility management (EMM) protocol and an EPS session management (ESM) protocol.

Figure 3:
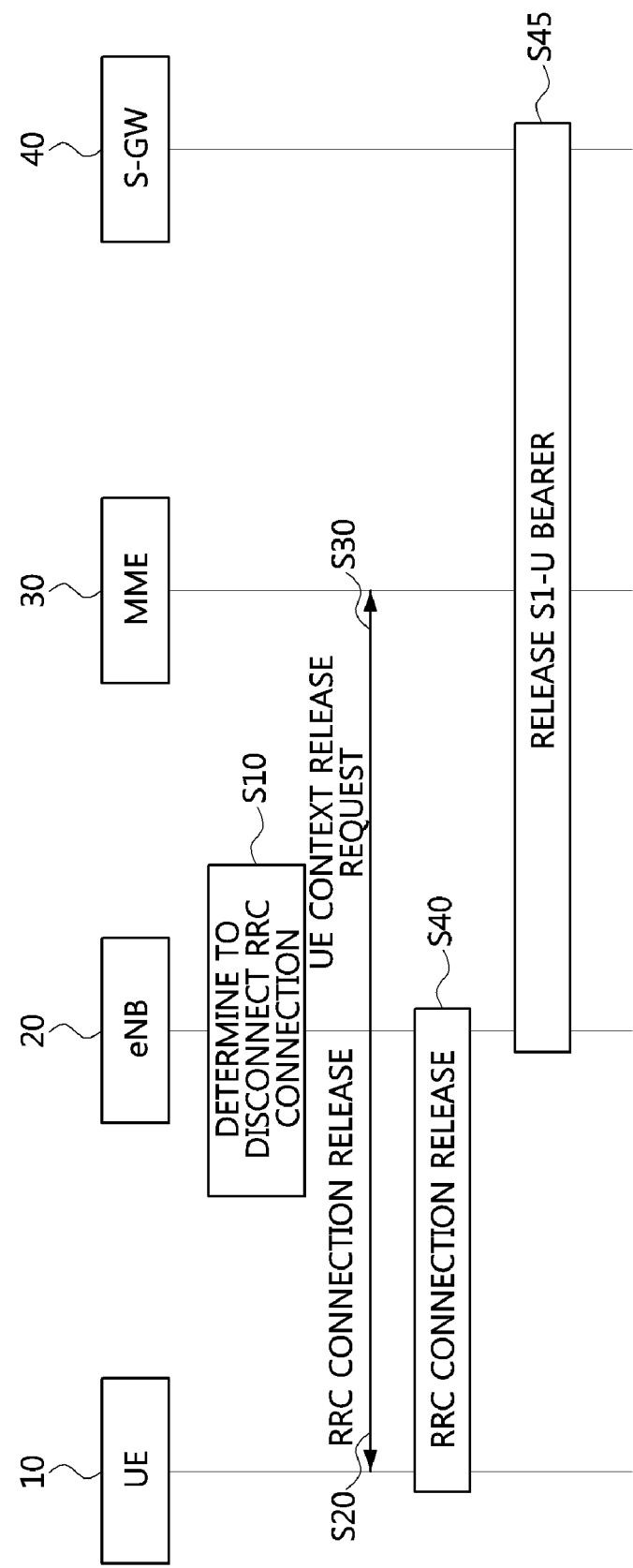
FIG. 3 is a sequence chart illustrating a process in which a conventional terminal transitions to an idle state.

FIG. 3 is a sequence chart illustrating a process in which a conventional terminal transitions to an idle state.

Referring to FIG. 3, the base station 20 may determine to disconnect an RRC connection when an inactive state of the terminal 10 is detected. The base station 20 may determine to release at least some of radio bearers and signaling radio bearers between the base station 20 and the terminal 10 (S10).

The base station 20 may then transmit an RRC connection release message. The RRC connection release message may include information on an identifier of the terminal 10 (S20). The terminal 10 may receive the RRC connection release message from the base station 20.

The base station 20 may transmit a UE Context release request message (S30). The MME 30 may receive the UE context release request message from the base station 20. The MME 30 may receive the UE context release request message and release UE context information of the terminal 10.

The base station 20 and the terminal 10 may release the RRC connection (S40). The base station 20 and the terminal 10 may release at least some of the radio bearers and the signaling radio bearers between each other.

The base station 20 may release the S1-U bearer with the S-GW 40 (S45). The state in which the S1-U bearer is released may refer to an ECM idle state.

Figure 4:
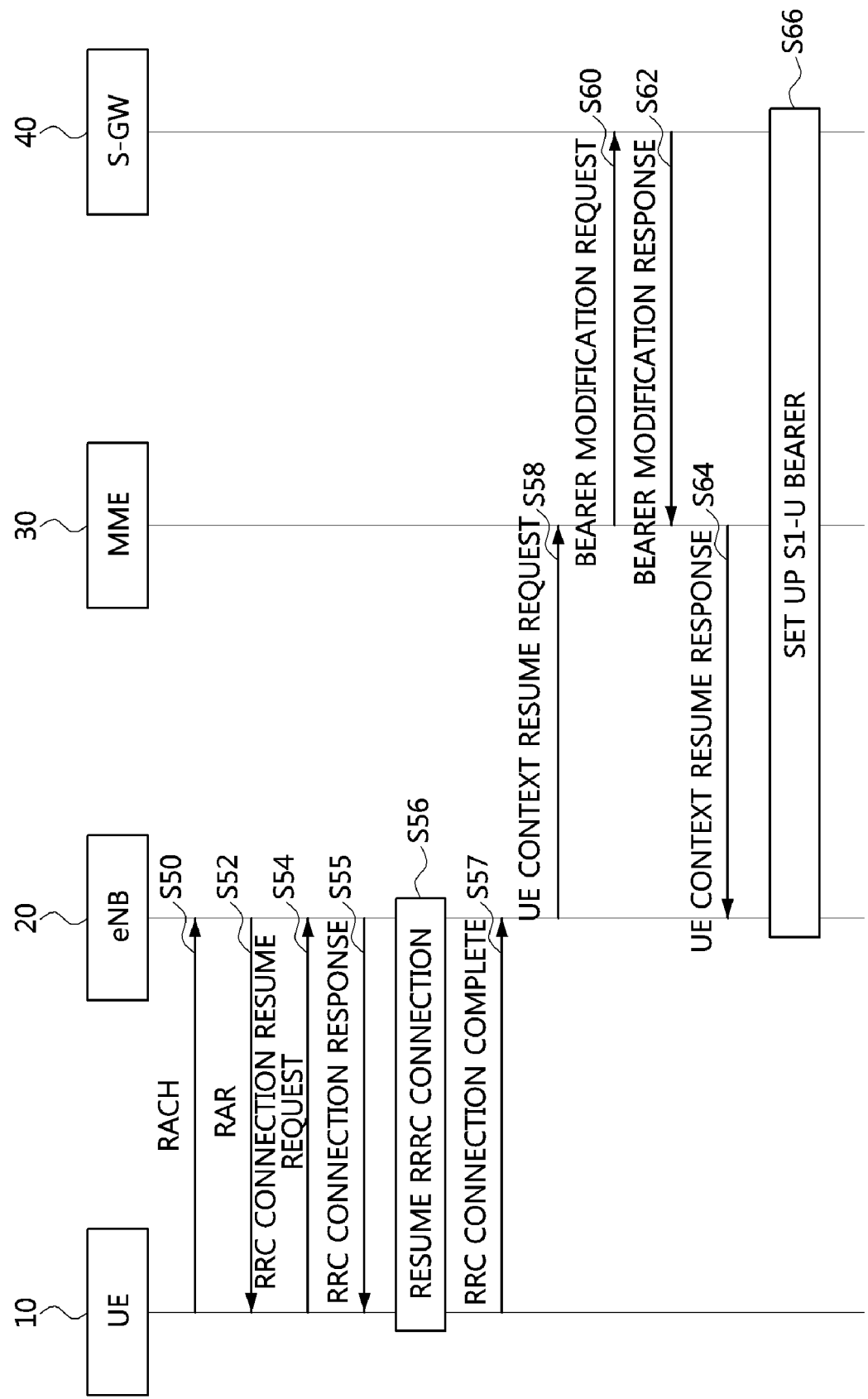
FIG. 4 is a sequence chart illustrating a process in which a conventional terminal transitions from an idle state to an active state.

FIG. 4 is a sequence chart illustrating a process in which a conventional terminal transitions from an idle state to an active state.

Referring to FIG. 4, the terminal 10 may transmit a random access channel (RACH) (S50). The terminal 10 may transmit a random access preamble and information such as a terminal identifier, an RRC connection mode indicator, and the like. The base station 20 may then receive the RACH from the terminal 10.

The base station 20 may transmit a random access response (RAR) message (S52). The base station 20 may transmit information such as a terminal identifier, a timing advance (TA), an uplink grant, and the like. The terminal 10 may receive the RAR message from the base station 20.

The terminal 10 may transmit an RRC connection resume request message (S54). The RRC connection resume request message may include information such as a terminal identifier, an RRC connection mode indicator, and the like. The base station 20 may receive the RRC connection resume request message from the terminal 10.

The base station 20 may transmit an RRC connection response message (e.g., RRC connection setup message in response to the RRC connection resume request message) (S55). The RRC connection response message may include information such as a terminal identifier, bearer indicators of radio bearers and signaling radio bearers between the base station 20 and the terminal 10, and the like. The terminal 10 may receive the RRC connection response message from the base station 20.

The terminal 10 and the base station 20 may resume the RRC connection (S56). The terminal 10 and the base station 20 may set up the radio bearers and the signaling radio bearers according to the bearer indicators previously shared.

The terminal 10 may transmit an RRC connection complete message (S57). The RRC connection complete message may include a NAS service request message. The base station 20 may receive the RRC connection complete message from the terminal 10.

The base station 20 may transmit a UE context resume request message (S58). The MME 30 may receive the UE context resume request message from the base station 20, and may acquire, store, and manage the UE context information of the terminal 10 again. The UE context information may include information on a downlink tunnel ID (TEID) allocated to the terminal 10, and the like.

The MME 30 may transmit a bearer modification request message (S60). The bearer modification request message may include an address of the base station 20, information on an S1 TEID allocated to the EPS bearer, and a delay downlink packet notification request message. The EPS bearer may include the S1-U bearer. The S-GW 40 may receive the bearer modification request message from the MME 30.

When the S-GW 40 completes the bearer modification operation, the S-GW 40 may transmit a bearer modification response message (S62). The MME 30 may receive the bearer modification response message from the S-GW 40.

The MME 30 may transmit a UE context resume response message in response to the UE context resume request message of the step S58 (S64). The base station 20 may receive the UE context resume response message.

The base station 20 and the S-GW 40 may set up the modified S1-U bearer and may communicate with each other using the S1-U bearer (S66).

As shown in FIG. 4, a considerable number of procedures may be performed when the terminal 10 transitions from the idle mode to the active mode. This may result in signaling overhead. Also, the delay time required for state transition in the terminal 10 may be longer.

Figure 5:
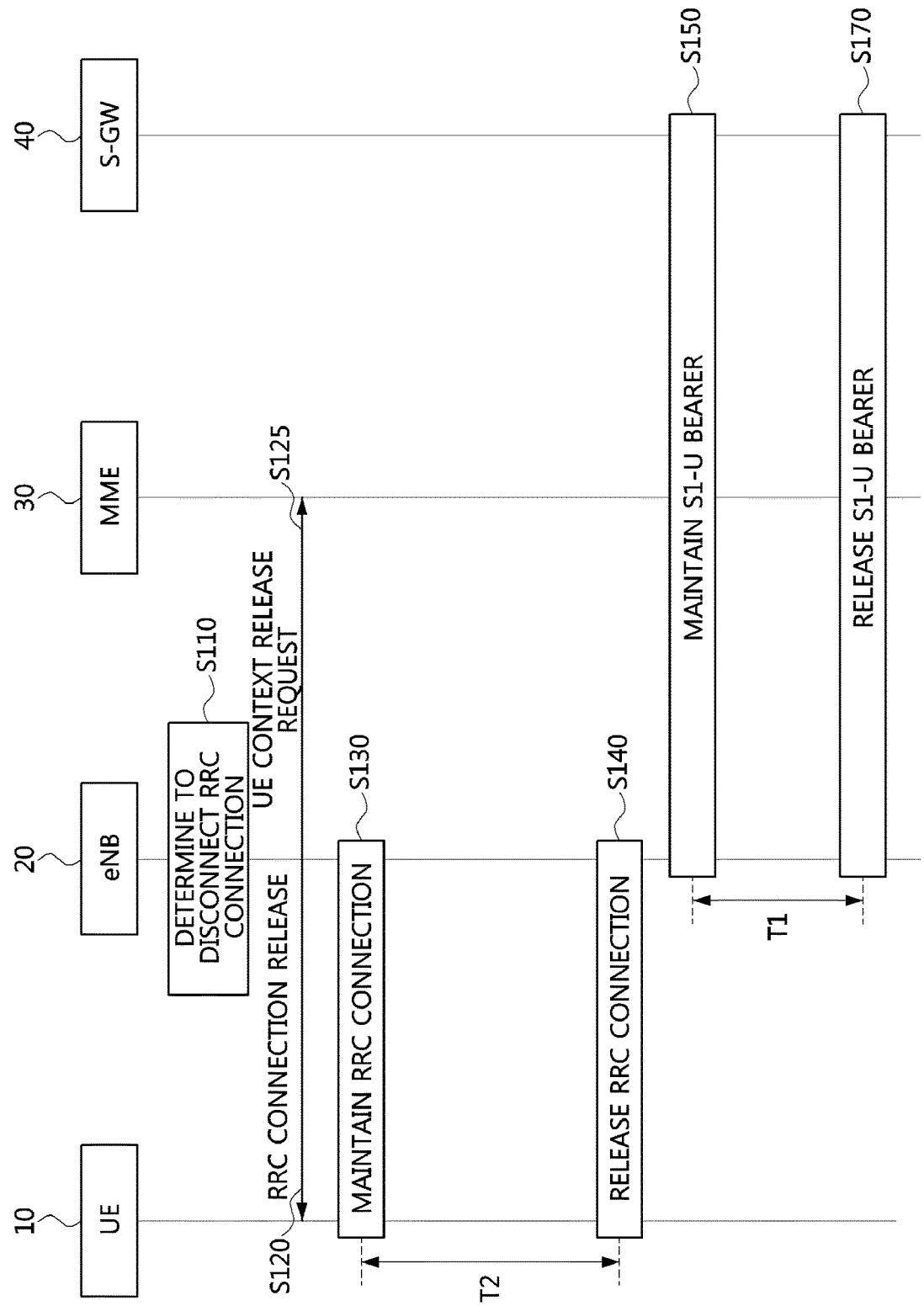
FIG. 5 is a sequence chart illustrating a process in which a terminal transitions to an idle state according to an embodiment of the present disclosure.

FIG. 5 is a sequence chart illustrating a process in which a terminal transitions to an idle state according to an embodiment of the present disclosure.

Referring to FIG. 5, the base station 20 may maintain the S1-U bearer for a first time T1 (described later) after the RRC connection is released. Also, the terminal 10 and the base station 20 may maintain the RRC connection for a second time T2 (described later) after the base station 20 transmits the RRC connection release message.

The base station 20 may detect an inactive state of the terminal 10 (S110). The base station 20 may detect the inactive state of the terminal 10 by analyzing the amount of uplink data transmitted by the terminal 10 and the amount of downlink data transmitted to the terminal 10. When the inactive state of the terminal 10 is detected, the base station 20 may determine to disconnect the RRC connection.

The base station 20 may transmit an RRC connection release message (S120). The RRC connection release message may include information on an identifier of the terminal 10. The RRC connection release message may include information on a second time T2 to be described later. The terminal 10 may receive the RRC connection release message from the base station 20.

The RRC connection release message may include the TA information for the terminal 10. The terminal 10 may receive the TA information from the base station 20 and store the received TA information. The terminal 10 may use the stored TA information in a procedure for transitioning to the active state described later.

The base station 20 may transmit a UE context release request message to the MME 30 (S125). The MME 30 may receive the UE Context release request message. The MME 30 may receive the UE context release request message from the base station 20. Upon receiving the UE context release request message, the MME 30 may immediately release the UE Context Information. As another example, the MME 30 may receive the UE context release request message and release the UE context information after a lapse of a predetermined time.

The terminal 10 may maintain the RRC connection for the second time T2. The terminal 10 may identify the second time T2 in the RRC connection release message received in the step S120. The terminal 10 may maintain the radio bearers and the signaling radio bearers for communication with the base station 20 for the second time T2. The base station 20 may also maintain the radio bearers and the signaling radio bearers for communication with the terminal 10 for the second time T2.

The second time T2 may be determined according to a traffic pattern of the terminal 10. For example, in case that a frequency of state transitions of the terminal 10 is expected to be high due to characteristics of an application being executed in the terminal 10, the base station 20 may set the second time T2 to be relatively large. On the other hand, in case that the frequency of state transitions of the terminal 10 is expected to be low due to the characteristics of the application being executed in the terminal 10, the base station 20 may set the second time T2 to be relatively small.

The base station 20 and the terminal 10 maintain the RRC connection for the second time T2, so that when the terminal 10 determines to return to the active state within the second time T2, the procedure for transitioning to the active state can be simplified.

If the terminal 10 does not decide to resume the RRC connection for the second time T2, the terminal 10 may release the RRC connection (S140). The terminal 10 may release the radio bearers and the signaling radio bearers for communication with the base station 20. If the RRC connection resume request message is not received from the terminal 10 for the second time T2, the base station 20 may release the RRC connection. The base station 20 may also release the radio bearers and the signaling radio bearers for communication with the terminal 10.

Accordingly, it is made possible to reduce resource consumption of the base station 20 and the terminal 10 by releasing the RRC connection between the base station 20 and the terminal 10 after a lapse of the second time T2.

The base station 20 may maintain the S1-U bearer for communication with the S-GW 40 for a first time T1 (S150). The base station 20 may release the RRC connection, and maintain the S1-U bearer for the first time T1.

The first time T1 may be determined according to a traffic pattern of the terminal 10. For example, in case that a frequency of state transitions of the terminal 10 is expected to be high due to characteristics of an application being executed in the terminal 10, the base station 20 may set the first time T1 to be relatively large. On the other hand, in case that the frequency of state transitions of the terminal 10 is expected to be low due to the characteristics of the application being executed in the terminal 10, the base station 20 may set the first time T1 to be relatively small.

The base station 20 and the terminal 10 maintain the S1-U bearer for the first time T1, so that when the base station 20 receives the RRC connection resume request message from the terminal 10 within the first time T1, the base station may omit the procedure of setting up the S1-U bearer again. Through this, the procedure for the terminal 10 to transition to the active state can be simplified.

If the base station 20 does not receive the RRC connection resume request message from the terminal 10 while the base station 20 maintains the S1-U bearer for the first time T1 after releasing the RRC connection, the base station 20 may release the S1-U bearer (S170). The base station 20 may reduce resource consumption by releasing the S1-U bearer.

Figure 6:
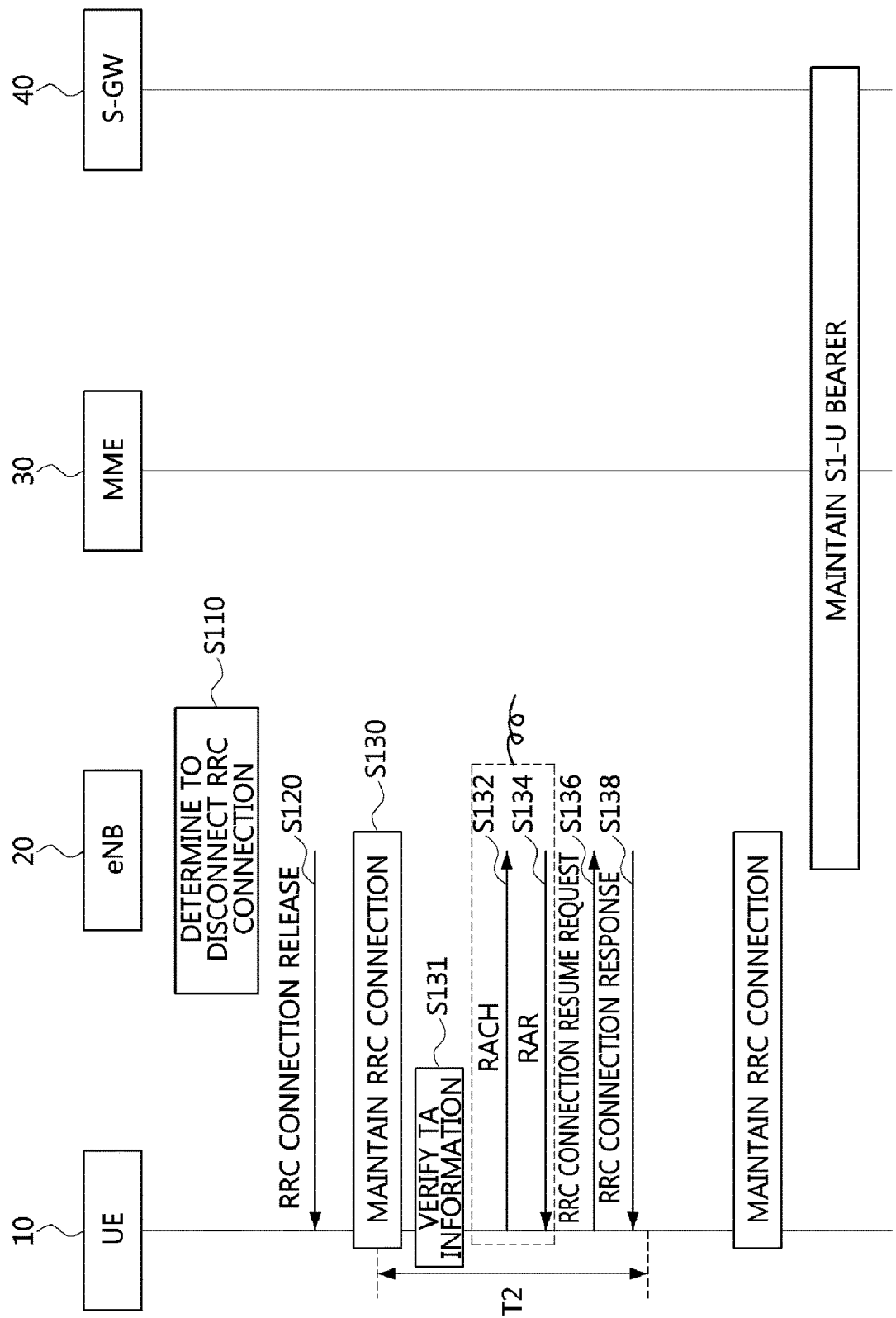
FIG. 6 is a sequence chart illustrating an example of a procedure to be performed when a terminal attempts to resume communication with a base station before a second time T2 of FIG. 5 has elapsed.

FIG. 6 is a sequence chart illustrating an example of a procedure to be performed when a terminal attempts to resume communication with a base station before the second time T2 of FIG. 5 has elapsed.

Referring to FIG. 6, the terminal 10 may receive an RRC connection release message from the base station 20 (S120). The terminal 10 may acquire information on the second time T2 from the RRC connection release message. The terminal 10 may receive the RRC connection release message and maintain the RRC connection. The RRC connection release message may include the TA information for the terminal 10. The terminal 10 may receive the TA information from the base station 20.

If the terminal 10 needs to resume communication with the base station 20 again before the time of maintaining the RRC connection exceeds the second time T2, the terminal 10 may verify validity of the TA information received from the terminal 20 in the step S120 (S131). For example, the terminal 10 may calculate a distance traveled after the terminal 10 receives the RRC connection release message through mobility speed estimation (MSE). When the traveled distance of the terminal 10 is smaller than a predetermined reference distance, the terminal 10 may determine that the TA information is valid. The terminal 10 may determine that the TA information is invalid if the traveled distance of the terminal 10 is larger than the predetermined reference distance.

If the TA information is invalid, steps S132 and S134 below may be performed.

The terminal 10 may transmit a RACH. The terminal 10 may transmit a random access preamble and information such as a terminal identifier, an RRC connection mode indicator, and the like (S132). The base station 20 may receive the RACH from the terminal 10.

The base station 20 may transmit a RAR message (S134). The base station 20 may transmit information such as a terminal identifier, a TA, an uplink grant, and the like. The terminal 10 may receive the RAR message from the base station 20. If the step S134 is completed, a step S136 below may be performed.

If the TA information is valid, the steps S132 and S134 may be omitted, and the step S136 below may proceed immediately.

If the terminal 10 determines that the TA information is valid, the terminal 10 may perform the step S136 using the TA information acquired in the step S120. The terminal 10 may maintain a connection with the base station 20 by using a Cell Radio Network Temporary Identifier (C-RNTI) previously allocated from the base station 20. By using the previously stored TA information and C-RNTI, the steps S132 and S134 may be omitted.

The terminal 10 may transmit an RRC connection resume request message to the base station 20 (S136). The RRC connection resume request message may include information such as a terminal identifier, an RRC connection mode indicator, and the like. The base station 20 may receive the RRC connection resume request message from the terminal 10.

The base station 20 may transmit an RRC connection response message (e.g., RRC connection setup message in response to the RRC connection resume request message) (S138). In this case, since the existing RRC connection is maintained, the RRC connection response message may not include information on indicators of the radio bearers and the signaling radio bearers.

As shown in FIG. 6, if the terminal 10 transmits the RRC connection resume request message before the second time T2 has elapsed and the base station 20 receives the RRC connection resume request message from the terminal 10, the base station 20 and the terminal 10 may maintain the RRC connection without releasing it. The base station 20 and the terminal 10 may maintain existing radio bearers and signaling radio bearers.

Figure 7:
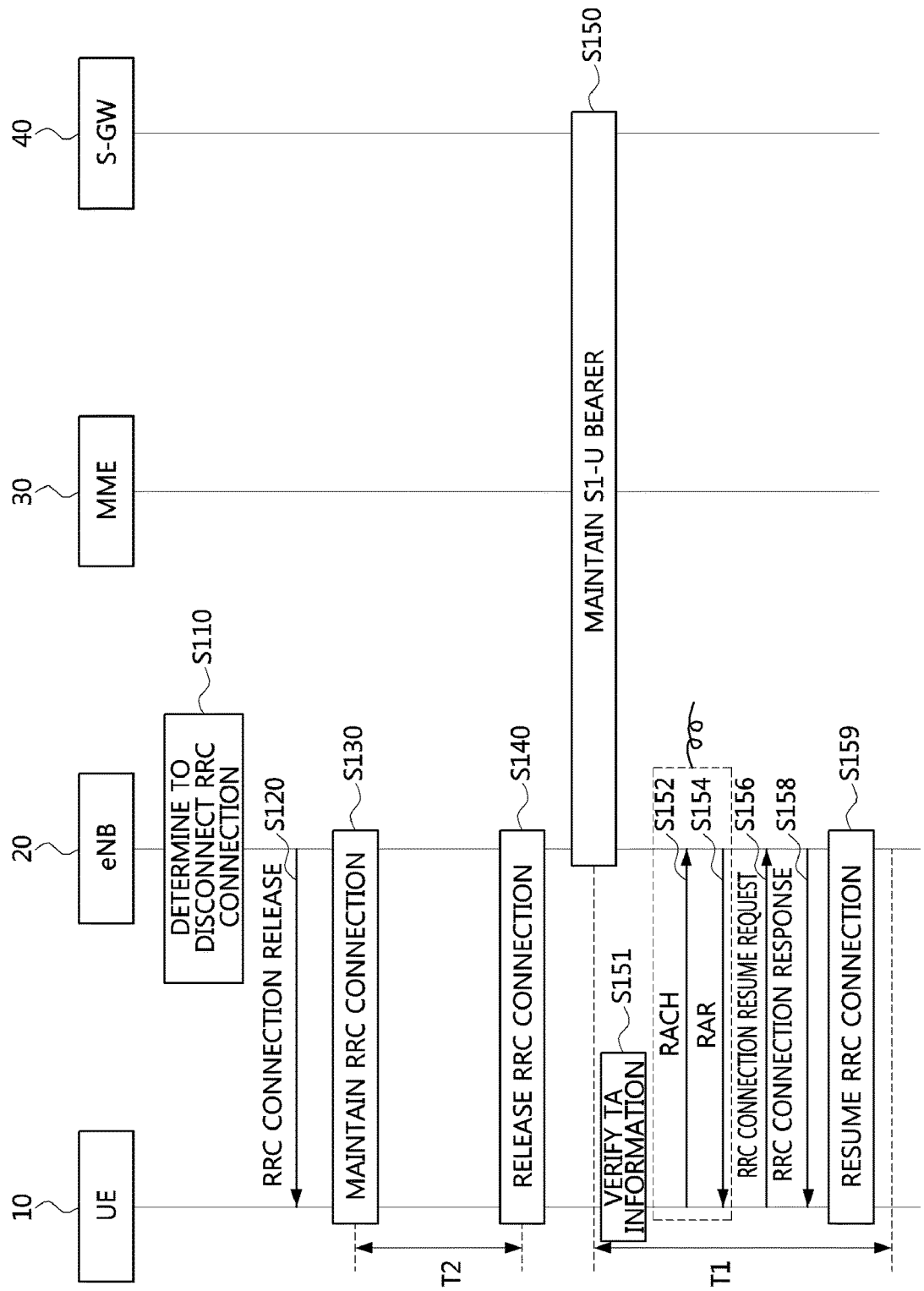
FIG. 7 is a sequence chart illustrating an example of a procedure to be performed when a terminal attempts to resume communication with a base station before a first time T1 of FIG. 5 has elapsed.

FIG. 7 is a sequence chart illustrating an example of a procedure to be performed when a terminal attempts to resume communication with a base station before a first time T1 of FIG. 5 has elapsed.

The base station 20 may transmit an RRC connection release message, maintain the RRC connection for the second time T2, and then release the RRC connection. The base station 20 may release the radio bearers and the signaling radio bearers (S140). That is, the terminal 10 may receive the RRC connection release message from the base station 20 and release the RRC connection after maintaining the RRC connection for the second time T2. The terminal 10 may release the radio bearers and the signaling radio bearers.

The base station 20 may release the RRC connection while maintaining the S1-U bearer (S150). If the RRC connection resume request message is not received from the terminal 10 while the base station 20 maintains the S1-U bearer for the first time T1, the base station 20 may release the S1-U bearer. If the base station 20 receives the RRC connection resume request message from the terminal 10 before the first time T1 has elapsed, the base station 20 may maintain the S1-U bearer.

The terminal 10 may verify validity of the TA information (S151). If the TA information is not valid, steps S152 and S154 below may be performed.

The terminal 10 may transmit a RACH (S152). The terminal 10 may transmit a random access preamble and information such as a terminal identifier, an RRC connection mode indicator, and the like. The base station 20 may receive the RACH from the terminal 10.

The base station 20 may transmit a RAR message (S154). The base station 20 may transmit information such as a terminal identifier, a TA, an uplink grant, and the like. The terminal 10 may receive the RAR message from the base station 20. If the step S154 is completed, a step S156 below may be performed.

If the TA information is valid, the steps S152 and S154 may be omitted, and the step S156 below may proceed immediately. If the terminal 10 determines that the TA information is valid, the terminal 10 may perform the step S156 using the TA information acquired in the step S120. The terminal 10 may maintain a connection with the base station 20 by using a C-RNTI previously allocated from the base station 20. By using the previously stored TA information and C-RNTI, the steps S152 and S154 may be omitted.

The terminal 10 may transmit an RRC connection resume request message to the base station 20 (S156). The RRC connection resume request message may include information such as a terminal identifier, an RRC connection mode indicator, and the like. The base station 20 may receive the RRC connection resume request message from the terminal 10.

The base station 20 may transmit an RRC connection response message (e.g., RRC connection setup message in response to the RRC connection resume request message) (S158). The RRC connection response message may not include information on indicators of the radio bearers and the signaling radio bearers.

The terminal 10 may set up the radio bearers and the signaling radio bearers based on the RRC connection response message received from the base station 20. The base station 20 may also set up the radio bearers and the signaling radio bearers.

As shown in FIG. 7, if the terminal 10 transmits the RRC connection resume request message before the first time T1 elapses and the base station 20 receives the RRC connection resume request message from the terminal 10, the base station 20 may maintain the S1-U bearer. The base station 20 and the terminal 10 may set up the radio bearers and the signaling bearers.

Figure 8:
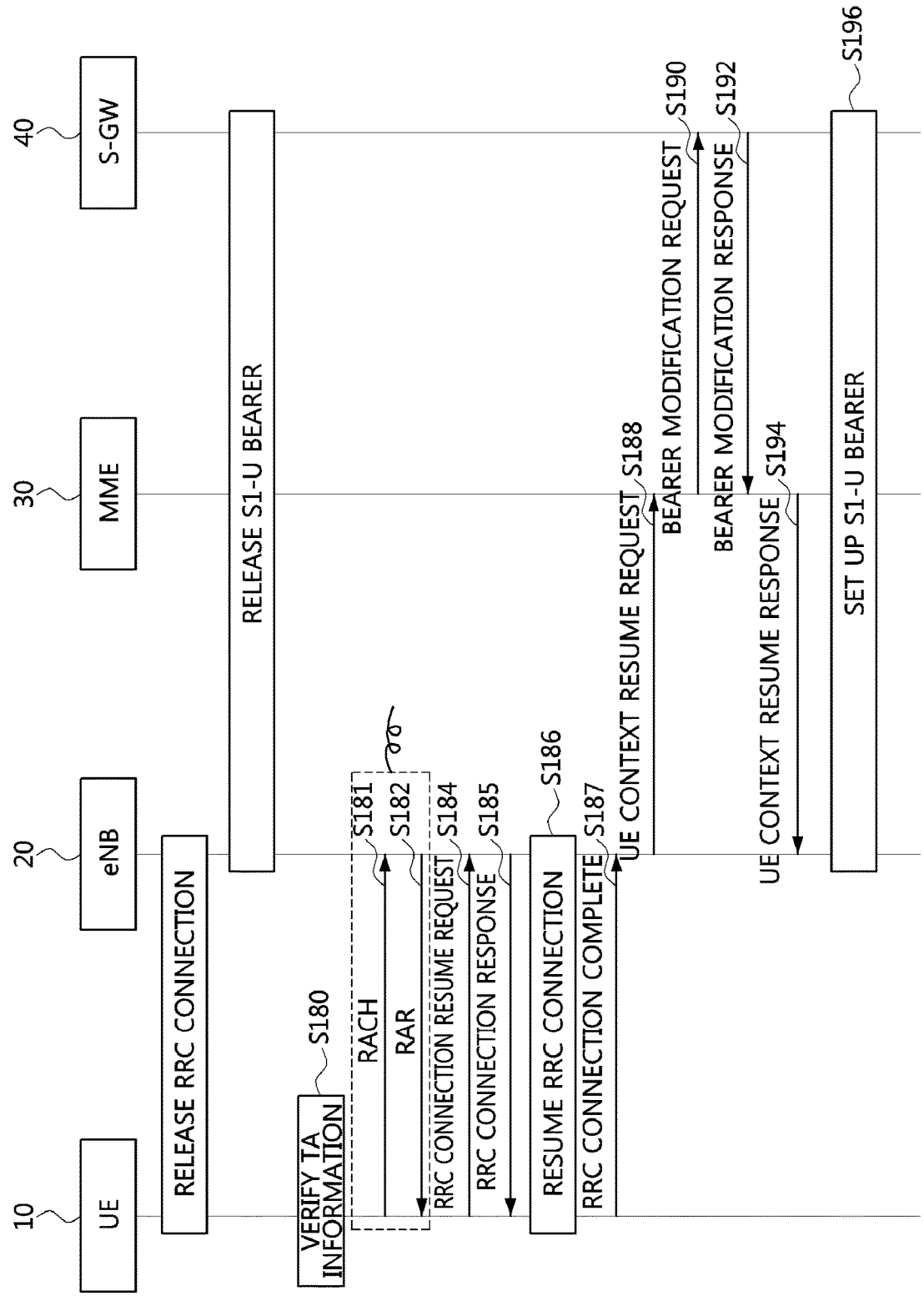
FIG. 8 is a sequence chart illustrating an example of a procedure to be performed when a terminal attempts to resume communication with a base station after a first time T1 of FIG. 5 has elapsed.

FIG. 8 is a sequence chart illustrating an example of a procedure to be performed when a terminal attempts to resume communication with a base station after a first time T1 of FIG. 5 has elapsed.

Referring to FIG. 8, after the lapse of the first time T1 of FIG. 5, the RRC connection may be released and then the S1-U bearer may also be released. Thus, resource management efficiency of the base station 20 and the terminal 10 may be enhanced.

The terminal 10 may verify validity of the TA information (S180). If the TA information is not valid, steps S181 and S182 may be performed.

The terminal 10 may transmit a RACH (S181). The terminal 10 may transmit a random access preamble and information such as a terminal identifier, an RRC connection mode indicator, and the like. The base station 20 may receive the RACH from the terminal 10.

The base station 20 may transmit a RAR message (S182). The base station 20 may transmit information such as a terminal identifier, a TA, an uplink grant, and the like. The terminal 10 may receive the RAR message from the base station 20. If the step S182 is completed, a step S184 below may be performed.

If the TA information is valid, the steps S181 and S182 may be omitted, and the step S184 below may proceed immediately. If the terminal 10 determines that the TA information is valid, the terminal 10 may perform the step S184 using the TA information acquired in the step S120 of FIGS. 5 to 7. The terminal 10 may resume the RRC connection with the base station 20 by using a C-RNTI previously allocated from the base station 20. By using the previously stored TA information and C-RNTI, the steps S181 and S182 may be omitted.

The terminal 10 may transmit an RRC connection resume request message to the base station 20 (S184). The RRC connection resume request message may include information such as a terminal identifier, an RRC connection mode indicator, and the like. The base station 20 may receive the RRC connection resume request message from the terminal 10.

The base station 20 may transmit an RRC connection response message (e.g., RRC connection setup message in response to the RRC connection resume request message) (S185). The RRC connection response message may not include information on indicators of the radio bearers and the signaling radio bearers.

The terminal 10 may set up the radio bearers and the signaling radio bearers based on the RRC connection response message received from the base station 20 (S186). The base station 20 may also set up the radio bearers and the signaling radio bearers.

The terminal 10 may transmit an RRC connection complete message (S187). The RRC connection complete message may include a NAS service request message. The base station 20 may receive the RRC connection complete message from the terminal 10.

In a step S188, the base station 20 may transmit a UE context resume request message. The MME 30 may receive the UE context resume request message from the base station 20, and may acquire, store, and manage the UE context information of the terminal 10 again. The UE context information may include information on a downlink tunnel ID (TEID) allocated to the terminal 10, and the like.

In a step S190, the MME 30 may transmit a bearer modification request message. The bearer modification request message may include an address of the base station 20, information on an S1 TEID allocated to the EPS bearer, and a delay downlink packet notification request message. The EPS bearer may include the S1-U bearer. The S-GW 40 may receive the bearer modification request message from the MME 30.

In a step S192, when the S-GW 40 completes the bearer modification operation, the S-GW 40 may transmit a bearer modification response message. The MME 30 may receive the bearer modification response message from the S-GW 40.

In a step S194, the MME 30 may transmit a UE context resume response message in response to the UE context resume request message of the step S188. The base station 20 may receive the UE context resume response message.

In a step 196, the base station 20 and the S-GW 40 may set up the modified S1-U bearer and may communicate with each other using the modified S1-U bearer. The S1-U bearer may be set up so as to transition to the ECM connected state.

The base station, the terminal, the operation method of the base station, and the operation method of the terminal according to embodiments of the present disclosure have been described above with reference to FIGS. 1 to 8. According to the above-described embodiments, since the base station maintains the S1-U bearer for a predetermined first time when the terminal transitions to an inactive state, the procedure required for the terminal to transition back to the active state can be simplified. Also, by maintaining the RRC connection between the terminal and the base station for a predetermined second time, the procedure required for the terminal to transition back to the active state can be simplified. Then, by including the TA information in the RRC connection release message and verifying the validity of the TA information before the terminal transmits the RRC connection resume request message, the base station can simplify the procedure required for the terminal to transition back to the active state.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a mobile communication network, the operation method comprising:
   determining to disconnect a radio resource control (RRC) connection;
   transmitting a RRC connection release message to a terminal;
   maintaining the RRC connection during a second time before releasing the RRC connection after transmitting the RRC connection release message; and
   receiving a RRC connection resume request message from the terminal,
   wherein, when the RRC connection resume request message is received before a time of maintaining the RRC connection exceeds the second time, the RRC connection is not released.

2. The operation method according to claim 1, wherein the RRC connection release message includes information on the second time.

3. The operation method according to claim 1, wherein the RRC connection release message includes information on a timing advance (TA) of the terminal.

4. The operation method according to claim 3, wherein, when the RRC connection resume request message is received without receiving a random access channel from the terminal after transmitting the RRC connection release message, information on a new TA is not transmitted.

5. An operation method of a terminal, the operation method comprising:
   receiving a radio resource control (RRC) connection release message including information on a timing advance (TA) of the terminal from a base station;
   maintaining a RRC connection between the terminal and the base station for a predetermined time after receiving the RRC connection release message;
   releasing the RRC connection after a lapse of the predetermined time;
   verifying a validity of the TA based on a traveled distance of the terminal; and
   when the TA is valid, transmitting a RRC connection resume request message by using the TA.

6. A base station in a mobile communication network, the base station comprising a processor and a memory storing at least one instruction executed by the processor, wherein the at least one instruction is configured to:
   determine to disconnect a radio resource control (RRC) connection;
   transmit a RRC connection release message including information on a timing advance (TA) of a terminal to the terminal;
   release the RRC connection with the terminal while maintaining an S1-U bearer set up between the base station and a serving gateway (S-GW); and
   release the S1-U bearer after maintaining the S1-U bearer for a first time, wherein
   when a RRC connection resume request message is received without receiving a random access channel from the terminal after transmitting the RRC connection release message, information on a new TA is not transmitted, and the RRC connection is resumed.

7. The base station according to claim 6, wherein the at least one instruction is further configured to maintain the RRC connection for a second time before releasing the RRC connection after transmitting the RRC connection release message.

8. The base station according to claim 7, wherein the RRC connection release message includes information on the second time.

9. The base station according to claim 6, wherein the at least one instruction is further configured to transmit a user equipment (UE) context release request message to a mobility management entity (MME).

* * * * *